United States Patent [19]

Vaseen

[11] 4,142,874
[45] Mar. 6, 1979

[54] SEPARATING GASEOUS NITROGEN OXIDES FROM OTHER GASES BY PARAMAGNETIC SEPARATION IN A LIQUID MEDIA

[76] Inventor: Vesper A. Vaseen, 9840 W. 35th Ave., Wheatridge, Colo. 80033

[21] Appl. No.: 890,822

[22] Filed: Mar. 27, 1978

[51] Int. Cl.² ............................................. B01D 19/00
[52] U.S. Cl. ............................................. 55/48; 55/3; 55/68
[58] Field of Search .................... 55/68, 48, 3, 100

[56] References Cited

U.S. PATENT DOCUMENTS

| | | | |
|---|---|---|---|
| 341,727 | 5/1886 | Cabell | 210/243 |
| 3,762,133 | 10/1973 | Merriman et al. | 55/68 |
| 3,972,824 | 8/1976 | Fooladi | 55/68 |
| 4,049,398 | 9/1977 | Vaseen | 55/68 |

*Primary Examiner*—Bernard Nozick

[57] ABSTRACT

Waste gases streams, particularly products of combustion contain quantities of nitrogen oxides which are damaging to the environment. Dissolving or absorbing these gases in an inert, nonmagnetic, absorber liquid provides a media which can then be passed through a high intensity magnetic field. The nitrogen oxides are subject to paramagnetic forces and thus migrate in the liquid to the poles of the magnet. Supersaturation of the nitrogen oxides near the vicinity of the poles causes the absorptive capacity of the liquid to be exceeded and the nitrogen oxides are thus stripped from the liquid. Gases such as carbon dioxide, carbon monoxide, sulphur oxides, hydrogen sulphide, hydrogen chlorine, among many, are not paramagnetic and thus remain in the liquid, to be stripped by other means and the liquid reused.

6 Claims, No Drawings

SEPARATING GASEOUS NITROGEN OXIDES FROM OTHER GASES BY PARAMAGNETIC SEPARATION IN A LIQUID MEDIA

REFERENCE

U.S. Patent Documents
341,727; 5/1886; Cabell; 210/243
1,056,043; 3/1913; Morrison; 55/3
1,056,244; 3/1913; Wiley; 55/68
1,722,458; 7/1929; DeBaufre; 55/68
3,177,633; 4/1965; McDonald, Jr.; 55/3
3,762,133; 10/1973; Merriman et al.; 55/08
4,049,398; 9/1977; Vaseen;
U.S. Patent Application
826,884 8/22/77; Vaseen; Ozone
1/10/77; Vaseen; Sulphuric/$O_3$
1/10/77; Vassen; Nitric/$O_3$

BACKGROUND OF THE INVENTION

Nitrogen oxides ($NO_x$) throughout the world have been estimated to be in excess of $55 \times 10^6$ tons per year with combustion emissions in urban areas identified as the major source. The United States accounts for half of the manmade $NO_x$ released to the atmosphere.

More than ninety percent (90%) of the manmade nitrogen oxides in the United States comes from fuel combustion in stationary sources and from transportation vehicles.

Important industrial sources of nitrogen oxides are tail gases from nitric acid manufacturing units, chamber sulphuric acid plants and various organic nitration process; e.g., the manufacture of cellulose nitrate and nitrobenzene, nitrofertilizers, metal dissolving operations, and many others.

Deletarious effects of $NO_x$ are dual-health effects and nuisance effects of photochemical smog.

$NO_x$ absorbs and scatters light. It undergoes a complex series of reactions in the air with photochemical oxidants, particulates, and sunlight, to form smog.

Aside from its familiar effects as an eye and respiratory irritant, $NO_x$ fades fabric dyes, and destroys synthetic textile fabrics.

Basically, there are three methods of cutting down on $NO_x$ emissions in central station boilers: 1— by water or steam injection; 2— by flue gas recirculation and; 3— by overfire air.

PRIOR ART

Catalytic reduction, flame reduction, adsorption, and absorption have been the principal methods of control by removal of $NO_x$'s.

Nitrogen oxides are reduced on a catalyst by reacting with fuels, such as hydrogen, carbon monoxide, propane, butane naptha, ammonia and others. Most industrial exhausts containing nitrogen oxides also contain appreciable amounts of oxygen, and are at temperatures above ambient. The catalytic approach of nitrogen oxides removals for this industrial problem is therefore not practical.

Flame reduction processes use gases containing nitrogen oxides and heats them to high temperatures then reacts them with fuels in a reducing atmosphere. Process is expensive, complex and uses up fuels for other purpose than creation of power.

Absorption of nitrogen oxides on silica gel, alumina, charcoal and commerical zeolites is possible but fee systems are in operation due to high cost of operation.

Absorption in packed tower scrubbers, etc. usually with chemical reactions involved, such as $2Na_2SO_3 + 2NO \rightarrow 2NaSO_4 + N_2$; $4Nc_2 SO_3 + 2NO_2 \rightarrow 4NaSO_4 + N_2$; or oxidation with chlorine dioxide, potassium permanganate, hydrogen peroxide. These processes are dependent on solubility factors, gases concentrations, temperature, and chemical reactions; with few satisfactory operating facilities; as well as high cost of operation.

SUMMARY OF OPERATION

The removal of nitrogen oxides from a gases stream, itself being for example, a stack gas containing products of combustion from fuel or a tail gas from manufacturing is accomplished as follows:

The cooled gases stream is scrubbed or washed with an inert, nonmagnetic, absorber liquid which has an affinity for absorbing or dissolving gases. The scrubber mechanism is one which will produce an intimate mixing of the gases with the scrubber liquid; such as a packed tower type. It is recommended the gases be cooled to near ambient as the colder the scrubber liquid is, the greater its absorption capacity for gases.

The use of an absorber liquid such as a polyorganosiloxane or a fluorocarbon as the specific absorber liquid makes it possible to not only collect the minor quantity nitrogen oxides with most of the carbon dioxide passing on through the scrubber, but also absorbs the nitrogen oxides in a liquid which can be then subjected to high intensity magnetic fields without chemical or physical change.

It is recommended the absorption be accomplished in a superatmospheric pressure vessel for both more efficient absorption of gases per volume of absorber liquid, and also for the ease of stripping the absorbed gases from the liquid following the paramagnetic nitrogen oxides removal. Subjecting the nitrogen oxides stripped liquid to ambient or subatmospheric pressures reduces the affinity of the liquid for absorption of gases, and releases them.

The nitrogen oxides pregnant absorber liquid is preferably while still under pressure, passed through the space between the poles of a high intensity magnet at a rate which permits the dissolved paramagnetic nitrogen oxides to migrate closer to the poles due to the differential magnetic strength produced on them in the magentic field. Since the absorber liquid was saturated or close to saturated with nitrogen oxide molecules; then as they migrate to the poles a condition of supersaturation occurs; and the molecules group to form bubbles which are rejected from the liquid and thus recoverable as a concentration of nitrogen oxides gases.

Once the absorber liquid has left the vicinity of the poles of the magnet it is returned to a subatmospheric or atmospheric pressure, which causes it to supersaturate with the remaining nonmagnetic absorbed gases, which are thus rejected and bubble out of solution to atmosphere.

The absorber liquid is then recycled to return use.

PREFERRED EMBODIMENT

In order to teach the art and science of removing nitrogen oxides from a gases stream by first dissolving the nitrogen oxides gases in an inert, dielectric, nonmagnetic liquid; the magnetically removing them the following example has been selected.

For example the tail gases from a nitric acid production plant would normally, as discharged to atmosphere, contain: 3% oxygen, 0.50 $NO_x$, 0.50% $H_2O$ vapor and 96.00% $N_2$. These represent 25.34 pounds $O_2$, 5.28 pounds $NO_x$, 2.38 pounds $H_2O$ and 354.82 pounds of $N_2$ for each 10,000 cubic feet (STP) of tail gas vented.

First a scrubber mechanism and gases absorbent liquid is selected. If the object of the paramagnetic nitrogen oxide gases removal is only to remove them from the vent stream then a polyorganosiloxane liquid with preferably 8 or more carbon atoms is selected. Preferably a liquid such as dimethyl polysiloxane $(CH_3)_3SiO((CH_3)_2SiO)_xSi(CH_3)_3$ or methylphenyl-polysiloxane $(CH_3)_3SiO((CH_3(C_6H_5)SiO)_xSi(CH_3)_3$. If a further object of the nitrogen oxides removal is to oxidize them in the absorber liquid to $NO_3$ for salvage as nitric acids; then a liquid more resistant to mineral acid oxidation is selected. Such liquids are the family of halogenated hydrocarbons or mixtures thereof, commonly called fluorocarbons, preferably of the type with 8 or more carbon atoms.

The absorber liquid should also meet the following criteria:
1. Boiling points in excess of 100° C (212° F)
2. Relatively nonvolatile
3. Retain its integrity at superatmospheric pressures up to 100 atmospheres; as well as subatmospheric pressures.
4. Be nonmiscible with water
5. Have stable physical/chemical properties
6. Be non biodegrable
7. Nonflammable
8. Nontoxic to organic life
9. Have a high affinity for absorbing gases
10. Be usable for repeat cycles
11. Be nonmagnetic
12. Be a dielectric type Preferably the absorber liquid is one of the fully halogen saturated, low molecular weight, hydrocarbons or mixtures thereof.

Those versed in the arts and sciences of inert liquids will have no difficulty in selecting many commercial products that meet these specifications.

The scrubber mechanism is preferably one which intimately commingles the gases stream with the selected absorbent liquid. Normally an absorption efficiency of the selected gas of 95% is not an unreasonably requirement. It is not necessary herein to teach the art and science of gases/liquids contacts in scrubber mechanism, for this is a well established commercial availability.

The absorber mechanism for scrubbing a gaseous vent containing nitrogen oxides and air is preferably one which intimately mixes the nitrogen oxides and air gases stream with the halogenated preferably, hydrocarbon liquid absorber liquid for example, perfluorocarbon $C_{10}F_{18}$ for a period of time, for example ten (10) seconds.

The quantity of absorber liquid used is, for example somewhat greater than the quantity required for theoretical absorbtion, for example 367 GPM, when absorbing 25.34 pounds of oxygen and 5.28 pounds of various nitrogen oxides or $NO_x$'s per day. This quantity is used when the pressure of operation of the scrubber mechanism, is for example, 10 atmospheres.

U.S. Pat. No. 4049398, issued May 28, 1977; V. A. Vaseen teaches the art and science of "the separation of oxygen from air by means of dissolving air in a nonmagnetic, inert liquid and then paramagnetically collecting the oxygen from the liquid."

The above invention concerns itself with the production of gaseous oxygen. This invention concerns itself with the same principals, except the paramagnetic accumulation of both nitrogen oxide and oxygen from the scrubber liquid, is for the purpose of separating the nitrogen oxide and oxygen from the scrubber liquid by concentrating the dissolved gases contained therein.

The scrubber liquid, preferably at a rate of 3.67 GPM, which has absorbed the nitrogen oxides and oxygen from the subject gas stream is caused to pass preferably for at least through 10 seconds a high intensity, 10 to 100 kOe, magnetic field. Both the north and the south pole of the electromagnetic nitrogen oxide and oxygen, absorbed or dissolved in the dielectric liquid.

Gaseous oxygen has a greater magnetic susceptibility than the nitrogen oxide at ambient as well as various other temperatures as illustrated by the following abstracted Table from "Handbook of Materials Science", Vol. 1, edited by C. T. Lyndi; CRC Press 1974.

OXYGEN HAS MAGNETIC SUSCEPTIBILITY

Gaseous — 293K + 3,449 ($10^{-6}$cgs)
Liquid — 90.1K + 7,699 ($10^{-6}$cgs)
Liquid — 70.8K + 8,685 ($10^{-6}$cgs)

NITROGEN HAS MAGNETIC SUSCEPTIBILITY

Gas; Ambient K; −12.0; ($10^{-6}$cgs)
Gaseous; NO; 293K; +1,461
NO; 203.8K; +1,895
NO; 146.9; +2,324
$NO_2$; 408; +150
$N_2O$; 285; −18.9
$N_2O_3$; 291; −16.0
$N_2O_3$; 303.6 −22.1
$N_2O_4$; 295.1 −23.0
(Aqueous) $N_2O_5$; 289; −35.6

The use of oxygen preferably as a controlling factor assures the greater efficiency in accumulation of the nitrogen oxide.

Retention through the high intensity magnetic lines of force for preferably not less than ten (10) seconds, is accomplished when for example the poles are (1) one inch apart and consist of 141 square inches of opposing surfaces.

A reduction in pressure of the environment, adjacent to the magnetic poles, of preferably not over one-half atmosphere when working a ten atmosphere closed system, permits collection of the supersaturated, effervescent nitrogen oxides and oxygen.

Following the removal and collection of the nitrogen oxides and oxygen, the absorber liquid is returned to atmospheric or subatmospheric pressure and the effervescent nitrogen and other nonparamagnetic gases stripped from the absorber liquid for collection or disposal.

The gases free absorber liquid is cooled as necessary and returned to system for recycle use at the scrubber.

The nitrogen oxides and oxygen collected are processed, preferably by ozonation, or ultraviolet radiation for conversion to nitric acid as a bi-product, or disposed of by chemical reaction with chemicals which produce insoluble solids which render them disposable, or by biochemical processing for satisfactory disposal.

What is claimed is:

1. An improvement in the art and science of recovering and concentrating; thus removing nitrogen oxides from a mixture of otherwise nonparamagnetic gases; comprising the steps of, the absorbing or dissolving the paramagnetic nitrogen oxides gases in, either a polyorganosiloxane or halogenated hydrocarbon liquid, preferably under superatmospheric pressure, then passing the absorber liquid, pregnant with paramagnetic nitrogen oxides gases, between the poles of a high intensity magnet, and its magnetic field, which by the paramagnetic qualities of the nitrogen oxides molecules, causes the nitrogen gases to collect at the north and south poles of the magnet, thus supersaturating the liquid absorber near the poles, forming bubbles of nitrogen oxides, gases, and, then effervescing from the absorbing liquid, for collection and/or other processing; with recycle of absorber liquid.

2. The method of claim 1 wherein the inert, absorber liquid used is liquid at ambient temperature and subatmospheric pressure, ($-5$) minus five atmospheres, or superatmospheric, ($+100$) plus one hundred atmospheres.

3. The method of claim 1 wherein the inert absorber liquid is a polyorganosiloxane.

4. The method of claim 1 wherein the inert absorber liquid is a halogenated hydrocarbon or mixture thereof.

5. The method of claim 1 wherein the high intensity magnetic forces range from 10 to 100 KOe.

6. The method of claim 1 wherein the absorber liquid, stripped of paramagnetic gases, following the magnets, is reduced in pressure to atmospheric or subatmospheric.

* * * * *